United States Patent
Yoshii et al.

(10) Patent No.: US 12,514,581 B2
(45) Date of Patent: Jan. 6, 2026

(54) ENDOSCOPIC TREATMENT DEVICE

(71) Applicant: OLYMPUS MEDICAL SYSTEMS CORP., Tokyo (JP)

(72) Inventors: Toshihiro Yoshii, Hachioji (JP); Naoki Takizawa, Musashino (JP)

(73) Assignee: OLYMPUS MEDICAL SYSTEMS CORP., Tokyo (JP)

( * ) Notice: Subject to any disclaimer, the term of this patent is extended or adjusted under 35 U.S.C. 154(b) by 964 days.

(21) Appl. No.: 17/683,836

(22) Filed: Mar. 1, 2022

(65) Prior Publication Data
US 2022/0280159 A1    Sep. 8, 2022

(30) Foreign Application Priority Data
Mar. 8, 2021  (WO) .................. PCT/JP2021/008932

(51) Int. Cl.
*A61B 17/00* (2006.01)
*A61B 17/08* (2006.01)
*A61B 17/122* (2006.01)
*A61B 17/128* (2006.01)

(52) U.S. Cl.
CPC ...... *A61B 17/083* (2013.01); *A61B 17/00234* (2013.01)

(58) Field of Classification Search
CPC ............ A61B 17/083; A61B 17/00234; A61B 17/1285; A61B 17/1227; A61B 17/12013; A61B 2017/00477
See application file for complete search history.

(56) References Cited

U.S. PATENT DOCUMENTS

| | | |
|---|---|---|
| 3,958,576 A | 5/1976 | Komiya |
| 4,367,746 A | 1/1983 | Derechinsky |
| 5,242,456 A | 9/1993 | Nash et al. |
(Continued)

FOREIGN PATENT DOCUMENTS

| | | |
|---|---|---|
| EP | 1 547 529 A1 | 6/2005 |
| JP | 2002-191609 A | 7/2002 |
(Continued)

OTHER PUBLICATIONS

May 11, 2021 International Search Report issued in International Patent Application No. PCT/JP2021/008932.
(Continued)

*Primary Examiner* — Anh T Dang
(74) *Attorney, Agent, or Firm* — Oliff PLC

(57) ABSTRACT

An endoscopic treatment device includes a clip unit having a first arm and a second arm connected with each other; a power transmission member; an applicator connected with the clip unit; an engaging portion provided in one of the proximal end portion or the power transmission member; and an engaged portion provided in the other of the proximal end portion or the power transmission member without the engaging portion, wherein the engaging portion includes a hook portion entering the engaged portion so as to be engageable with the engaged portion; a support portion continuing with the hook portion; and a protrusion portion having a dimension so as to be impossible to enter the engaged portion, and at least one of the hook portion and the support portion is deformed to release the engagement between the engaging portion and the engaged portion.

20 Claims, 10 Drawing Sheets

(56) References Cited

U.S. PATENT DOCUMENTS

| | | | |
|---|---|---|---|
| 5,569,274 A | 10/1996 | Rapacki et al. | |
| 5,766,189 A | 6/1998 | Matsuno | |
| 6,814,742 B2 | 11/2004 | Kimura et al. | |
| 7,727,247 B2 | 6/2010 | Kimura et al. | |
| 7,854,739 B2 | 12/2010 | Satake et al. | |
| 8,152,824 B2 | 4/2012 | Kimura et al. | |
| 8,157,824 B2 | 4/2012 | Kimura et al. | |
| 8,172,859 B2 | 5/2012 | Matsuno et al. | |
| 8,348,964 B2 | 1/2013 | Kimura et al. | |
| 8,444,660 B2 | 5/2013 | Adams et al. | |
| 8,465,501 B2 | 6/2013 | Matsuoka et al. | |
| 8,529,585 B2 | 9/2013 | Jacobs et al. | |
| 8,672,952 B2 | 3/2014 | Suzuki | |
| 9,138,234 B2 | 9/2015 | Li et al. | |
| 9,662,113 B2 | 5/2017 | Satake et al. | |
| 9,687,248 B2 | 6/2017 | Satake et al. | |
| 9,949,740 B2 | 4/2018 | Satake et al. | |
| 10,524,801 B2 | 1/2020 | Muyari et al. | |
| 10,828,035 B2 | 11/2020 | Maekubo | |
| 11,141,166 B2 | 10/2021 | Itoh et al. | |
| 11,234,707 B2 | 2/2022 | Yu et al. | |
| 2002/0045909 A1 | 4/2002 | Kimura et al. | |
| 2005/0143767 A1 | 6/2005 | Kimura et al. | |
| 2010/0217292 A1 | 8/2010 | Kimura et al. | |
| 2010/0217293 A1 | 8/2010 | Kimura et al. | |
| 2010/0217294 A1 | 8/2010 | Kimura et al. | |
| 2015/0230799 A1* | 8/2015 | Satake | A61B 17/122 606/142 |
| 2015/0305741 A1 | 10/2015 | Satake et al. | |
| 2018/0353183 A1 | 12/2018 | Maekubo | |
| 2020/0205836 A1* | 7/2020 | Uesaka | A61B 17/1222 |
| 2021/0267602 A1 | 9/2021 | Tsuji et al. | |
| 2022/0233197 A1 | 7/2022 | Takizawa et al. | |
| 2022/0233198 A1 | 7/2022 | Yoshii et al. | |

FOREIGN PATENT DOCUMENTS

| | | |
|---|---|---|
| JP | 2002-360589 A | 12/2002 |
| JP | 2006-198388 A | 8/2006 |
| JP | 2009-022776 A | 2/2009 |
| JP | 2010-029629 A | 2/2010 |
| JP | 5750620 B2 | 7/2015 |
| WO | 2020/095427 A1 | 5/2020 |
| WO | 2020/095428 A1 | 5/2020 |
| WO | 2020122120 A1 | 6/2020 |

OTHER PUBLICATIONS

Apr. 27, 2021 International Search Report issued in International Patent Application No. PCT/JP2021/009575.

Oct. 8, 2024 Notice of Allowance issued in Japanese Patent Application No. 2023-504974.

Jul. 4, 2023 Notice of Allowance issued in Japanese Patent Application No. 2022-031146.

Apr. 19, 2022 International Search Report issued in International Patent Application No. PCT/JP2022/002771.

Nov. 28, 2023 Notice of Allowance issued in U.S. Appl. No. 17/575,883.

* cited by examiner

FIG. 7
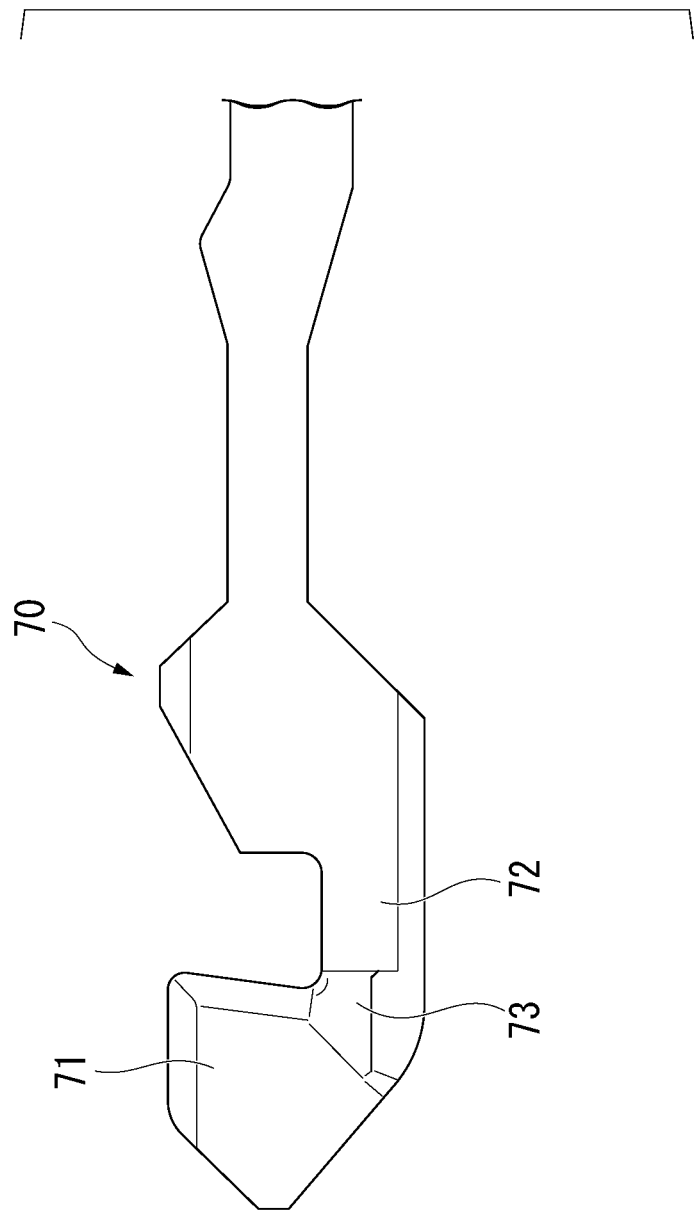
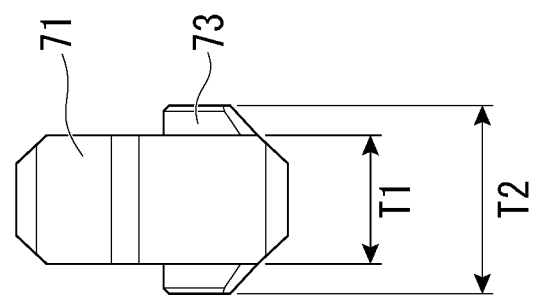

ENDOSCOPIC TREATMENT DEVICE

CROSS-REFERENCE TO RELATED APPLICATION

This nonprovisional application claims the benefit of PCT International Application No. PCT/JP2021/008932, filed Mar. 8, 2021. The disclosure of the prior application is hereby incorporated by reference herein in its entirety.

TECHNICAL FIELD

The present disclosure relates to an endoscopic treatment device, more specifically, relates to an endoscopic treatment device including a clip unit for ligating tissues.

BACKGROUND ART

The ligation of tissues by using a clip unit is known as an endoscopic treatment. The clip unit includes a pair of arms. When the pair of arms are pulled by a predetermined amount in a state of grasping the tissues, the pair of arms are locked in a state of firmly tightening the tissues.

The clip unit as a treatment unit is introduced into the body in a state of being mounted on an actuator. The clip unit is indwelled in the body in a state of ligating the tissues such that it is necessary to separate the pair of arms from the actuator after being locked.

The clip unit disclosed in Japanese Patent (Granted) Publication No. 5750620 has a configuration in which proximal end portions of a pair of arms are accommodated in a pressing tube. The proximal end portions of the pair of arms are connected with an operation wire.

When the operation wire is pulled to draw the proximal end portions of the pair of arms outside of the pressing tube by a predetermined amount and then release the connection of the pair of arms and the operation wire, the pair of arms are locked in a closed state. Accordingly, until the proximal end portions of the pair or arms are drawn outside of the pressing tube by the predetermined amount, it is possible to push the operation wire so as to open the pair of arms which are half closed.

SUMMARY

According to an aspect of the present disclosure, an endoscopic treatment device includes a clip unit including an arm portion having a first arm and a second arm, the first arm and the second arm being connected with each other at a proximal end portion of the arm portion; a power transmission member; an applicator connected with the clip unit; an engaging portion provided in one of the proximal end portion or the power transmission member; and an engaged portion provided in the other of the proximal end portion or the power transmission member without the engaging portion, wherein the engaging portion includes a hook portion entering the engaged portion so as to be engageable with the engaged portion; a support portion continuing with the hook portion; and a protrusion portion having a dimension so as to be impossible to enter the engaged portion, and wherein when a force is applied to the power transmission member in a state in which the engaging portion and the engaged portion are engaged with each other, at least one of the hook portion and the support portion is deformed so as to release the engagement between the engaging portion and the engaged portion.

According to another aspect of the present disclosure, A clip unit configured to be connectable with an applicator having an engaging portion includes an arm portion including a first arm and a second arm, and an engaging portion being engageable with the engaged portion at a proximal end portion of the arm portion; and a tubular member having a distal end opening and a proximal end opening, a proximal end side of the arm portion being able to be accommodated in the tubular member from the distal end opening, wherein the engaging portion includes a hook portion entering the engaged portion so as to be engageable with the engaged portion; a support portion continuing with the hook portion; and a protrusion portion having a dimension so as to be impossible to enter the engaged portion.

According to a further aspect of the present disclosure, an endoscopic treatment device includes a clip unit including an arm portion configured from a first arm and a second arm and an engaged portion; an applicator including an engaging portion configured to be detachably connected with the engaged portion; a hook portion provided in the engaging portion, disposed between the first arm and the second arm in an open-close direction of the arm portion, and being engageable with the engaged portion; and a protrusion portion provided in the engaging portion and having a dimension larger than that of the hook portion in the open-close direction of the arm portion.

BRIEF DESCRIPTION OF DRAWINGS

FIG. 7 is an enlarged view of a hook.

FIG. 9 is not a view showing the present endoscopic treatment device.

DESCRIPTION OF EMBODIMENTS

An embodiment of the present disclosure is described by referring to FIG. 1 to FIG. 9.

Figure 1:
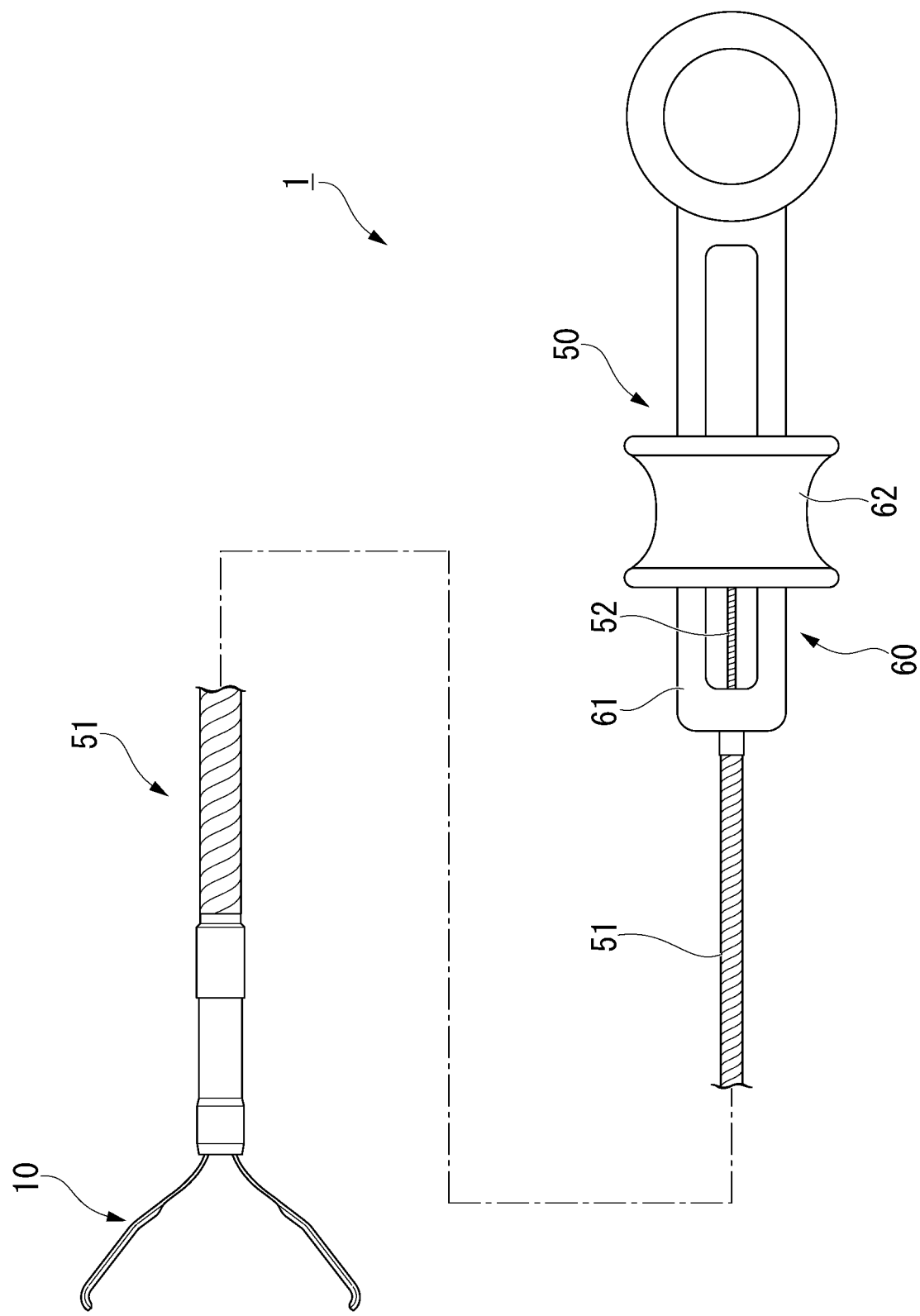
FIG. 1 is a view showing an overall configuration of an endoscopic treatment device according to a first embodiment of the present disclosure.

FIG. 1 is a view showing an exterior appearance of an endoscopic treatment device 1 according to the present embodiment. The endoscopic treatment device 1 includes a clip unit 10 that is indwelled in the body and an applicator 50 configured to operate the clip unit 10. The clip unit 10 is attached to a tip end (distal end) of the applicator 50.

Figure 2:
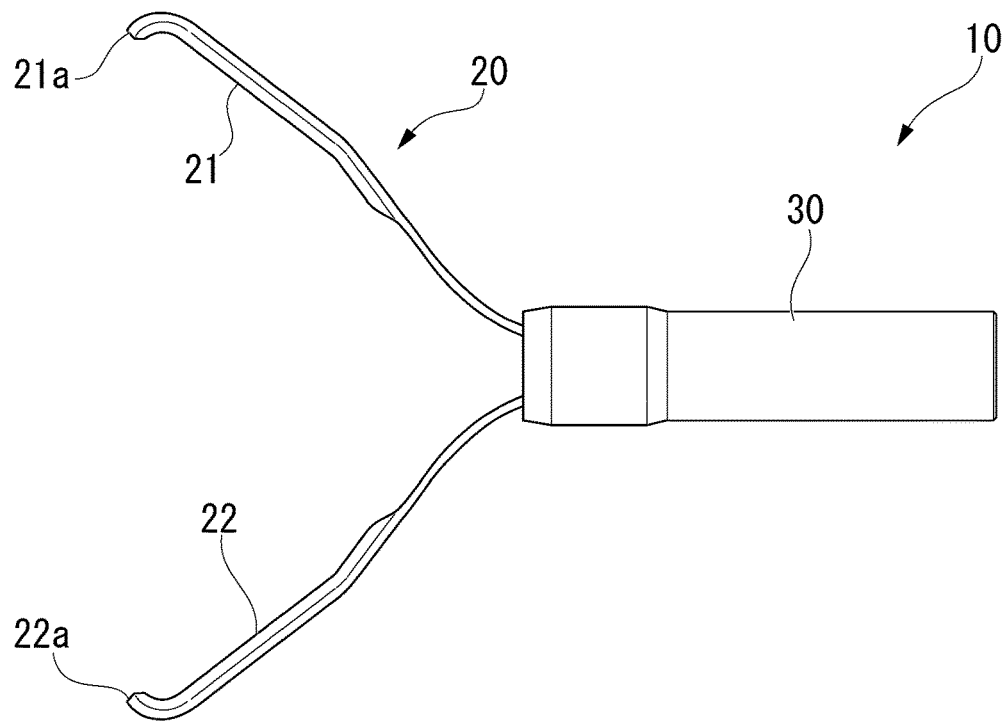
FIG. 2 is a view showing a clip unit of the endoscopic treatment device.
Figure 3:
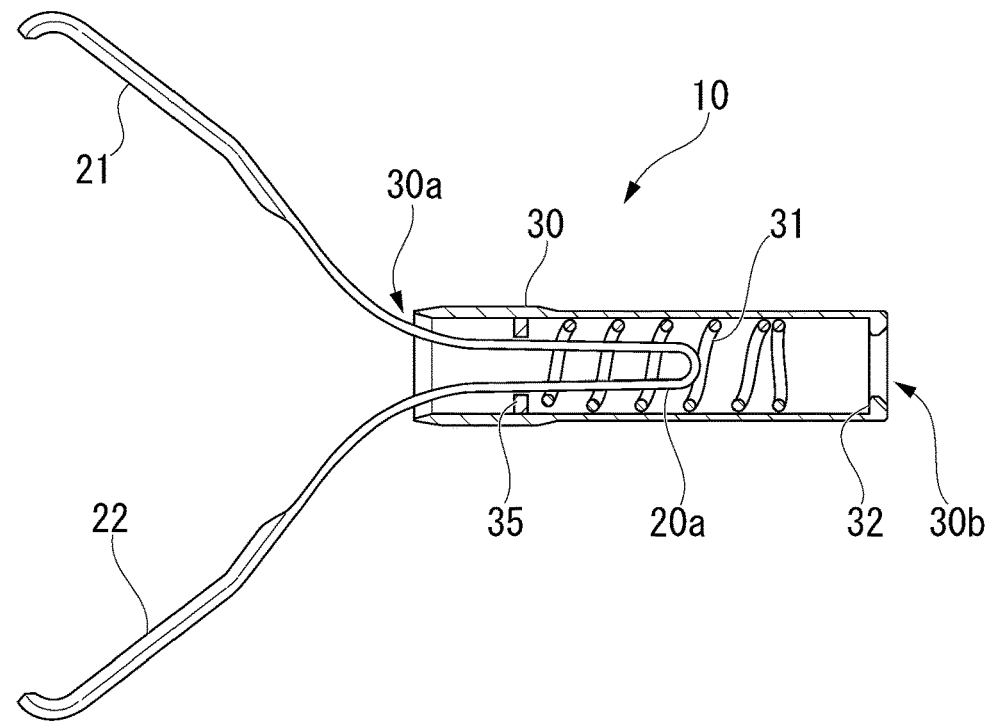
FIG. 3 is a cross-sectional view showing the clip unit.

FIG. 2 is a view showing an exterior appearance of the clip unit 10. FIG. 3 is a cross-sectional view of the clip unit 10. As shown in FIG. 2, the clip unit 10 includes an arm portion 20 and a pressing tube (tubular member) 30 in which part of the arm portion 20 is accommodated.

The arm portion 20 includes a pair of arms as a first arm 21 and a second arm 22. The first arm 21 and the second arm 22 include a claw 21a and a claw 22a at the distal end portions respectively. As shown in FIG. 3, the first arm 21 and the second arm 22 are connected with each other at a proximal end portion 20a of the arm portion 20. The proximal end portion 20a is formed in a U-shape.

The arm portion 20 is made of an alloy material or a metal material. Examples of the material of the arm portion 20 include the stainless steel, the cobalt-chromium alloy, the nickel-titanium alloy, and the like.

The first arm 21 and the second arm 22 are expanded to be open in an initial state as shown in FIG. 2. The first arm 21 and the second arm 22 are configured to generate a biasing force to return to the initial state due to the elastic force of the material when the first arm 21 and the second arm 22 approach each other from the initial state.

The pressing tube 30 is a tubular member made of a metal material, a resin or the like. As shown in FIG. 3, the proximal end portion 20a of the arm portion 20 is accommodated in the pressing tube 30. The distal end portion of the arm portion 20 is configured to protrude from a distal end opening 30a of the pressing tube 30. A proximal end opening 30b of the pressing tube 30 is smaller than the distal end opening 30a.

Figure 4:
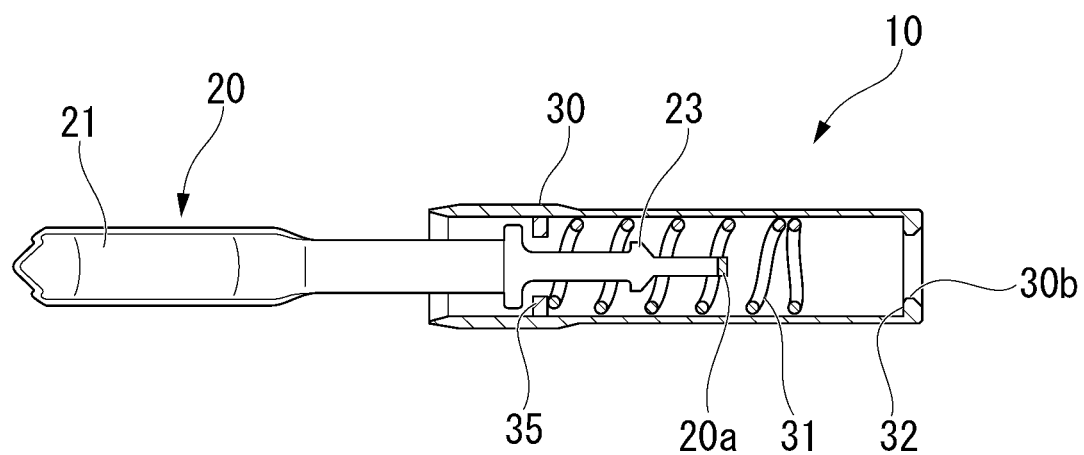
FIG. 4 is a cross-sectional view showing the clip unit from a different direction from that in FIG. 3.

FIG. 4 is a view showing the interior of the pressing tube 30 that is viewed from a different direction from that in FIG. 3. As shown in FIG. 4, a locking portion 23 is provided in an intermediate portion of each arm of the arm portion 20, and a dimension of each arm 21, 22 in the width direction at the locking portion 23 is large (only the first arm 21 can be viewed in FIG. 4). Each locking portion 23 can pass through the proximal end opening 30b when the first arm 21 and the second arm 22 approach each other. When the first arm 21 and the second arm 22 separate from each other after passing through the proximal end opening 30b, the locking portion 23 cannot pass through the proximal end opening 30b. As a result, the arm portion 20 is locked in a state in which the pair of arms are closed.

A coil spring 31 is disposed inside the pressing tube 30. A proximal end of the coil spring 31 is able to come into contact with a proximal end surface 32 of the pressing tube 30 including the proximal end opening 30b.

A washer 35 is disposed at the distal side of the coil spring 31. An inner diameter of the washer 35 is smaller than the inner diameter of the coil spring 31. The distal side of the first arm 21 and the second arm 22 are larger in the width than that of the proximal end portion and the distal end side of the first arm 21 and the second arm 22 has the dimension that is impossible to enter the washer 35. Accordingly, the washer 35 has the configuration to be in contact with the distal side rear surface of the first arm 21 and the second arm 22 such that the distal side of the first arm 21 and the second arm 22 does not enter the coil spring 31 without providing an end coil portion having a small inner diameter in the coil spring 31.

For example, part of the above-described configuration of the arm portion 20 and the pressing tube 30 is known and disclosed in PCT International Publication No. WO 2014/181676; however, it is possible to apply the following modifications to the configuration.

The opening width of the arm portion 20 in the initial state may be appropriately changed by changing a bending angle (curvature radius) between a region inside the pressing tube 30 and a region outside the pressing tube 30 in the initial state. At this time, by decreasing the curvature radius, it is possible that the restoration property to the initial state will be reduced; however, it is possible to prevent the reduction by changing the plate thickness of the arm portion. Furthermore, it is possible to provide multiple variations with different opening widths in the initial state by only changing the curvature radius and using the same member.

For example, the arm portion can be manufactured by punching and bending a metal plate material; however, it is possible to chamfer the edge portion in contact with the internal surface of the pressing tube after the manufacturing so as to make the movement inside the pressing tube 30 to be smooth and prevent the wear and the damage to the pressing tube by the edge portion.

As shown in FIG. 1, the applicator 50 includes an elongated insertion portion 51, an operation wire (power transmission member) 52 inserted through the insertion portion 51, and an operation portion 60 connected to the insertion portion 51.

The structure of the distal end side of the insertion portion 51 will be described below, with regard to the portion other than the distal end portion, for example, it is possible to adopt a sheath formed from a coil. In the case of using the coil sheath, it is preferable to process the distal and proximal end surfaces to be flat by the polishing procedure or the like.

The operation portion 60 includes a main body 61 connected with the insertion portion 51, and a slider 62 attached to the main body 61 to be slidable with respect to the main body 61.

As the operation wire 52, it is possible to adopt a twisted wire made of the metal wire, for example. The proximal end portion of the operation wire 52 is connected to the slider 62. When the slider 62 is moved with respect to the main body 61, it is possible to advance and retract the operation wire 52 in the insertion portion 51.

The connection aspect of the operation wire 52 and the slider 62 is appropriately determined, and an example will be described referring to FIG. 5.

At first, a block 101 including a penetration horizontal hole 101a and a bottomed vertical hole 101b communicating with the horizontal hole 101a is prepared. As shown in the part (a) of FIG. 5, the operation wire 52 passing through the pipe 102 for preventing the buckling is made to pass the horizontal hole 101a.

Figure 5:
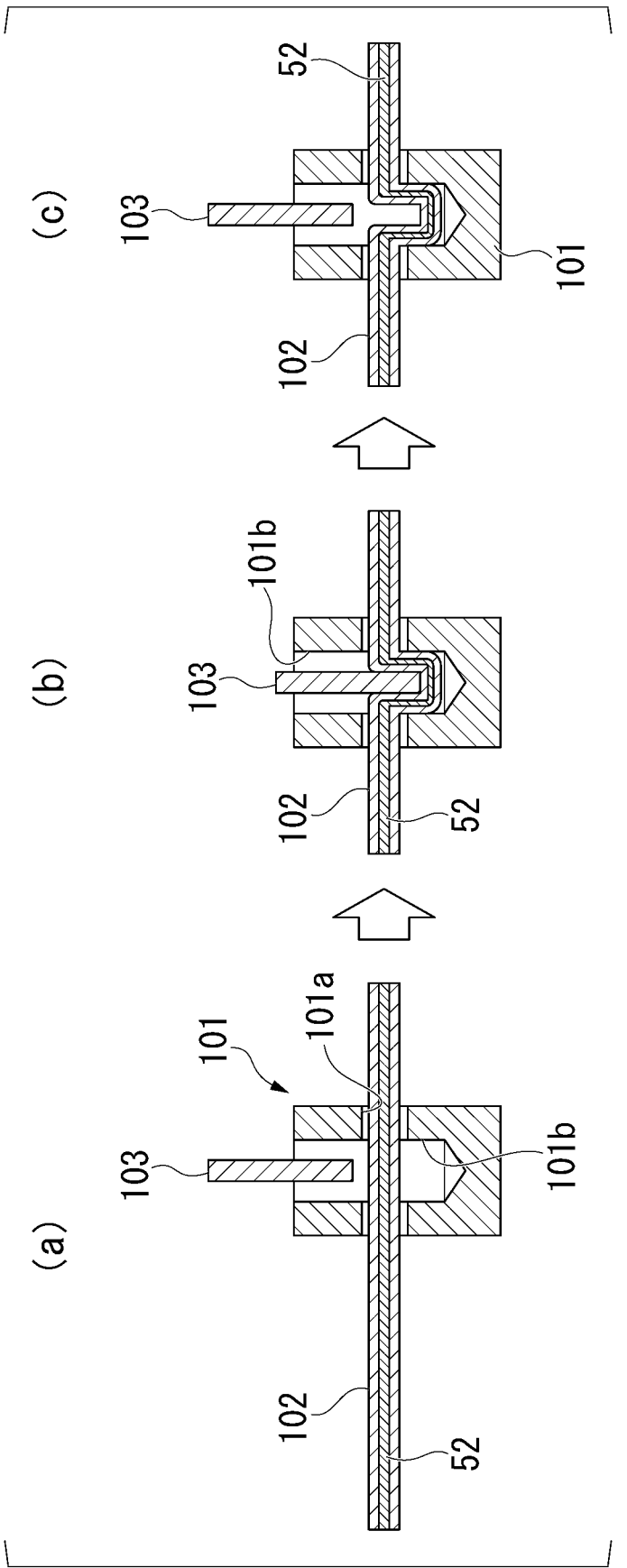
FIG. 5 is a view showing connection procedures of a slider and a wire.

As shown in the part (b) of FIG. 5, when the pin 103 is inserted into the vertical hole 101b and then the pipe 102 and the operation wire 52 are pressed toward the bottom of the vertical hole 101b to perform the caulking, part of the pipe 102 and the operation wire 51 are bent to enter the vertical hole 101b. As a result, as shown in the part (c) of FIG. 5, even the pin 103 is removed, it is impossible for the pipe 102 and the operation wire 52 to slip out from the block 101 such that the pipe 102 and the operation wire 52 are fixed to the block 101.

Thereafter, it is possible to connect the pipe 102 and the operation wire 52 to the slider 62 by assembling the block 101 to the slider 62.

Figure 6:
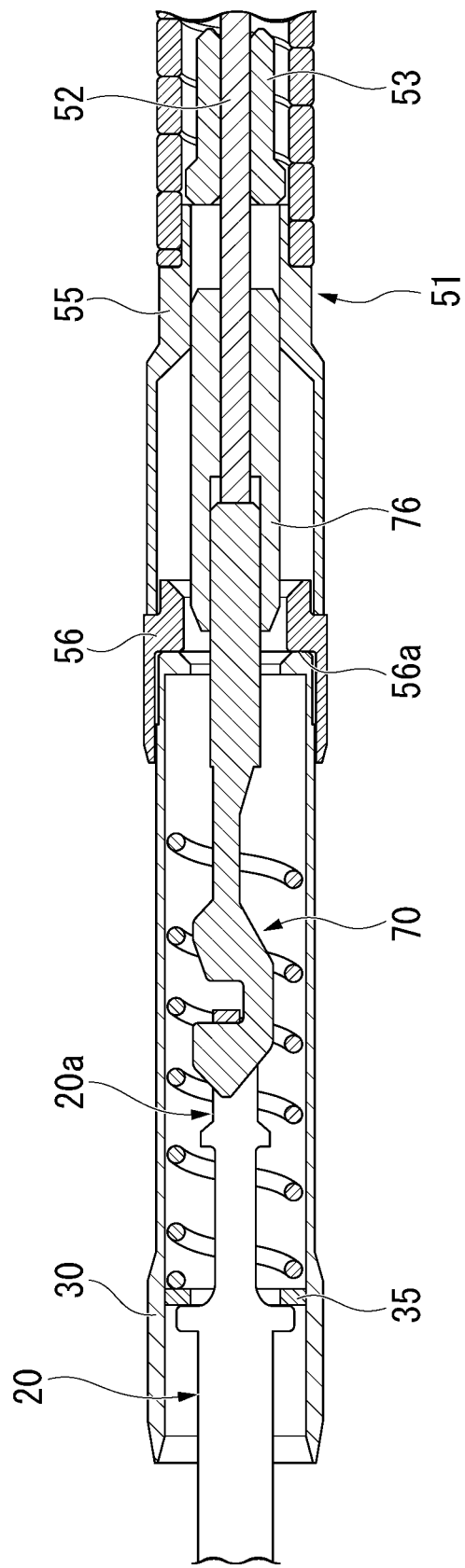
FIG. 6 is an enlarged cross-sectional view showing a portion of the endoscopic treatment device for mounting the clip thereto.

FIG. 6 is an enlarged view showing the distal end portion of the applicator 50 to which the clip unit 10 is attached. The clip unit 10 and the applicator 50 are detachably connected to each other by the hook (engaging portion) 70 disposed at the distal end of the operation wire 52 engaging with the proximal end portion (engaged portion) 20a of the arm portion 20.

The distal end portion of the insertion portion 51 includes a tubular first member 55 and a tubular second member 56 attached to the distal side of the first member 55.

The outer diameter of the proximal portion of the second member 56 is smaller than the inner diameter of the first member 55, and the second member 56 is connected to the first member 55 by welding or the like in a state of entering the first member 55. The inner diameter of the distal side of the second member 56 is larger than the outer diameter of the pressing tube 30 and the proximal portion of the pressing tube 30 enters the second member 56. The inner diameter of the proximal side of the second member 56 is smaller than that of the distal side of the second member 56 such that the second member 56 is formed in the structure in which a step surface 56a is generated due to the difference of the diameters and the step surface 56a can support the proximal portion of the pressing tube 30.

The hook 70 passes through the inside of the first member 55 and the second member 56 to enter the pressing tube 30 and the hook 70 is engaging with the proximal end portion 20a of the arm portion 20 inside the pressing tube 30.

The hook 70 is attached to a connection member 76 fixed to the distal end of the operation wire 52 by the brazing or the like.

FIG. 7 is an enlarged view showing the hook 70. The left side of FIG. 7 is a front view of the hook 70, and the right side thereof is the right-side view of the hook 70. The distal side of the hook 70 includes a hook portion 71 locked to the arm portion 20, a support portion 72 extending backwardly from the hook portion 71, and a protrusion portion 73 formed at the boundary portion of the hook portion 71 and the support portion 72. The support portion 72 is generally parallel to the operation wire 52, and there is an approximately right angle formed between the proximal surface 71a of the hook portion 71 and the extending direction of the support portion 72.

Figure 8:
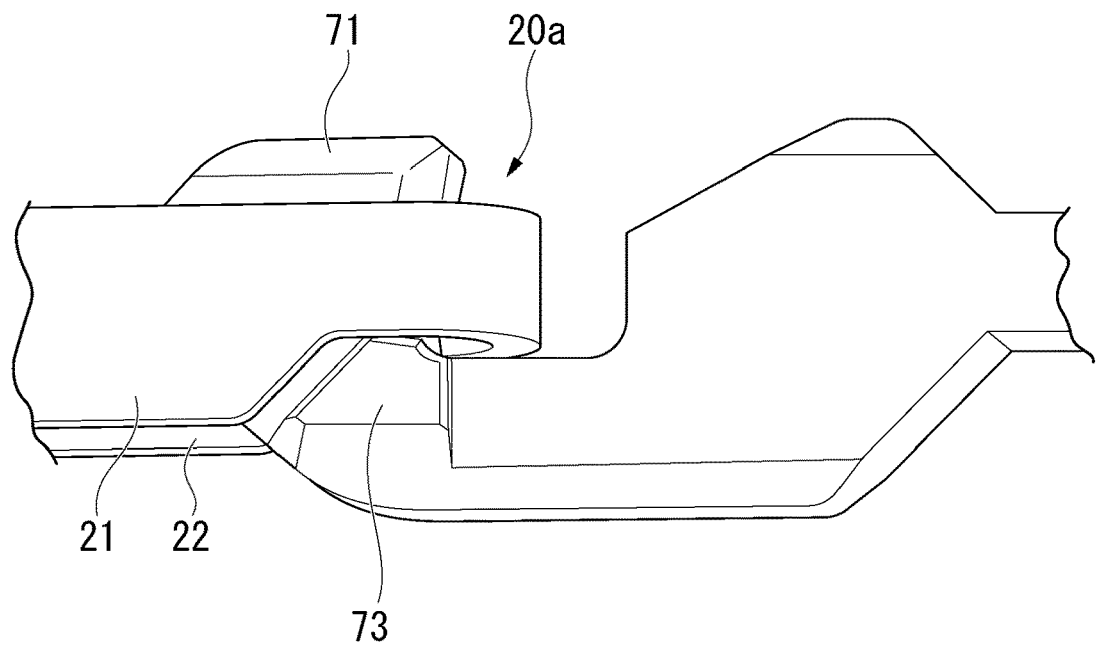
FIG. 8 is an enlarged view showing an engagement portion of the hook and the arm portion.

The hook portion 71 and the support portion 72 has approximately the same thickness (the thickness T1 shown in FIG. 7); however, the thickness of the protrusion portion 73 is the thickness T2 that is larger than the thickness T1. The distance between the first arm 21 and the second arm 22 in the proximal end portion 20a of the arm portion 20 is equal to or larger than the thickness T1 and less than the thickness T2. Accordingly, as shown in FIG. 8, the hook portion 71 enters the space between the first arm 21 and the second arm 22 to be locked to the proximal end portion 20a. On the other side, the protrusion portion 73 interferes with the first arm 21 and the second arm 22 such that the protrusion portion 73 cannot enter the space between the first arm 21 and the second arm 22.

The hook 70 having the above-described shape can be manufactured by using the plate material having the thickness T2 to perform the forging procedure, the Metal Injection Mold (MIM) procedure or the like.

A stopper 53 is attached to the operation wire 52. The shape and the dimension of the stopper 53 are determined to be impossible to enter the first member 55 such that when the stopper 53 comes into contact with the proximal end of the first member 55, the operation wire 52 cannot advance any further. The exterior surface of the stopper 53 is chamfered such that it is difficult for the operation wire 52 to interfere with the insertion portion 51 when the operation wire 52 is advanced and retracted in the insertion portion 51.

The operations when the endoscopic treatment device 1 having the above-described configuration is used will be described. The endoscopic treatment device 1 is introduced into the body through the channel of the endoscope. When the user inserts the endoscopic treatment device 1 into the endoscope, the user retracts the slider 62 by a predetermined amount so as to insert the arm portion 20 in a state in which the arm portion 20 is closed and the arm portion 20 is not locked. The clip unit 10 in which the arm portion 20 is closed and the distal end portion of the insertion portion 51 may be inserted into the endoscope in a state of being accommodated in an outer sheath that is separately prepared.

When the user protrudes the endoscopic treatment device 1 from the opening of the channel of the distal end portion of the endoscope and then reduces the force pulling the slider or retracting the outer sheath, the arm portion 20 advances with respect to the pressing tube 30 due to the elastic restoration force of the arm portion 20 itself and the elastic restoration force of the coil spring 31. As a result, the pair of arms 21, 22 enter the open configuration in which the pair of arms 21, 22 are open. When the stopper 53 comes into contact with the proximal end of the first member 55, the arm portion 20 cannot advance with respect to the pressing tube 30 such that the open configuration is maintained and the arm portion 20 does not slip out from the pressing tube 30.

If the outer sheath is too short, when the outer sheath is retracted, the endoscopic treatment device 1 advances powerfully due to the above-described elastic restoration force such that it is preferable to adopt the outer sheath with the length (for example, approximately 30 millimeters) slightly shorter than the length of the insertion portion 51.

When the user retracts the slider 62 with respect to the main body 61, the operation wire 52 and the hook 70 are pulled and the arm portion 20 is retracted with respect to the pressing tube 30. As a result, the pair of arms 21, 22 enters the closed configuration in which the pair of arms 21, 22 are closed. The user positions the tissues between the pair of arms 21, 22 and then close the pair of arms 21, 22 to ligate the tissues. Until the locking operation described below is performed, by advancing the slider 62 with respect to the main body 61, it is possible to transition the pair of arms 21, 22 from the closed configuration to the open configuration. Accordingly, according to the endoscopic treatment device 1, until the locking operation is performed, it is possible to re-grasp the tissues by operating the clip unit using the operation wire 52.

Within the movement range of the operation wire 52 where the re-grasp operation is able to perform, at least part of the distal side of the hook 70 is positioned at the proximal side inside the second member 56 where the inner diameter is small such that it is impossible that the engagement of the hook 70 and the proximal end portion 20a is released between the re-grasp operation.

When it is determined that it is suitable to ligate the tissues positioned between the pair of arms 21, 22, the user performs the locking operation for fixing the closed state of the arm portion 20. During the locking operation, the user further retracts the slider 62 with respect to the main body 61 to exceed the range where it is possible to perform the re-grasp operation. When the slider 62 is retracted, the operation wire 52 is pulled and the pair of arms 21, 22 becomes approximately parallel to each other while grasping the tissues to enter the pressing tube 30. Furthermore, the locking portions 23 provided in the pair of arms 21, 22 approach each other to become the positional relationship capable of passing through the proximal end opening 30*b* of the pressing tube 30.

The pair of locking portions 23 passing through the proximal end opening 30*b* and moving to the outside of the pressing tube 30 separates from each other to become the positional relationship that is impossible to pass through the proximal end opening 30*b* again. As a result, the pair of locking portions 23 come into contact with the proximal end surface of the pressing tube 30 so as to prevent the arm portion 20 from protruding from the pressing tube 30 and the arm portion 20 is locked to maintain the closed configuration.

When the user further retracts the slider 62, the arm portion 20 further retracts and the locking portion 23 passes through the proximal end opening 30*b* to move to the outside of the pressing tube 30. Furthermore, the locking portion 23 is locked to the proximal end surface of the pressing tube 30 and the arm portion 20 is locked to be unable to open.

When the user further retracts the slider 62, the distal side of the hook 70 deforms due to the retraction force. For example, the hook portion 71 deforms such that the proximal surface 71*a* and the support portion 72 enters a state to be approximately parallel to each other or the support portion 72 deforms such that the hook portion 71 rotates around the support portion 72 as a rotation center.

As a result, the engagement of the hook 70 and the proximal end portion 20*a* is released and the pressing tube 30 is separated from the second member 56 such that the clip unit 10 is indwelled in the tissues.

When the user removes the endoscope and the applicator 50 to the outside of the body, the series of procedures are finished.

In the endoscopic treatment device 1, after the arm portion 20 is locked, it is possible to release the engagement between the arm portion 20 and the hook 70 by further retracting the hook 70 only such that basically, there is no case in which the hook 70 advances after the arm portion 20 is locked. However, in the case in which the user does not notice that the arm portion 20 has been locked and tries to perform the re-grasp operation, it is possible that the hook 70 is operated to advance. At this time, even the hook 70 is operated to advance, since the arm portion 20 cannot advance, it is possible that the longitudinal direction of the arm portion and the longitudinal direction of the hook are not parallel to each other.

Figure 9:
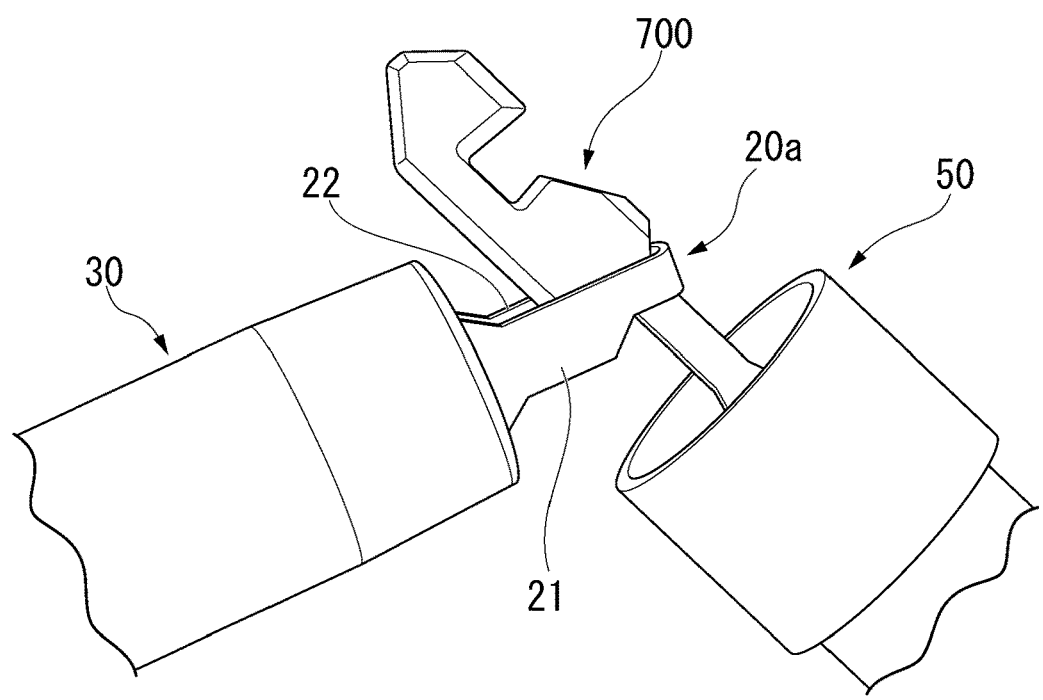
FIG. 9 is a view showing a state in which it is difficult to release the connection of the hook and the arm portion.

In this case, as shown in FIG. 9, after consideration, the inventor finds that it is possible that the advanced hook 700 (this hook is not the hook included in the endoscopic treatment device 1) may enter the space between the first arm 21 and the second arm 22 in the proximal end portion 20*a* of the arm portion. Furthermore, in the state as shown in FIG. 9, it is known that it becomes significantly difficult to separate the hook 70 from the proximal end portion 20*a*.

The inventor further studies with the configuration and successes in eliminating the possibility by providing the protrusion portion 73 in the hook 70, wherein the protrusion portion 73 has the dimension and the size that is unable to enter the space between the first arm 21 and the second arm 22. Accordingly, even the user accidentally advances the hook 70 after the arm portion 20 is locked, the protrusion portion 73 interferes with the proximal end portion 20*a* so as to be unable to enter the space between the first arm 21 and the second arm 22 and the state as shown in FIG. 9 can be definitely prevented.

As described above, according to the endoscopic treatment device 1 described in the present embodiment, it is possible to realize the re-grasping operation of the tissues by the clip unit 10 while releasing the connection of the applicator 50 and the clip unit 10 by pulling the operation wire 52 only such that the operations become easy. Furthermore, as described above, it is possible to definitely prevent the situation in which it becomes difficult to release the connection of the applicator 50 and the clip unit 10 due to the operations after the arm portion is locked.

In the endoscopic treatment device 1, the first member 55 having the large inner diameter and the second member 56 having the small inner diameter are attached to the distal end of the insertion portion 51. Accordingly, it is possible to definitely support the pressing tube 30 by the second member 56 while applying the force with the necessary amount to the arm portion for the locking operations. As described above, when the two end surfaces of the coil sheath are processed to be flat, the force with the large amount can be stably received by the applicator 50 such that the support becomes further stable.

Furthermore, until the arm portion 20 is locked, the hook 70 is positioned in the portion proximal to the second member 56 where the inner diameter is further narrower such that the large displacement of the hook 70 due to the deformation is prevented and the connection state with the arm portion 20 is definitely maintained.

Additionally, after the arm portion 20 is locked, the hook 70 is positioned in the large space inside the first member 55 such that the space suitable for the large displacement due to the deformation is secured. As a result, it is possible to smoothly release the connection of the arm portion and the hook by the traction of the operation wire 52.

Hereinbefore, one embodiment of the present disclosure has been described; however, the scope of the present disclosure is not limited to the above-described embodiment. Configurations can be added, omitted, replaced, and other modifications without departing from the spirit of the present invention. Hereinafter, several changes will be described as examples, however, other changes are possible to be applied. Two or more of these changes may be combined as appropriate.

Figure 10:
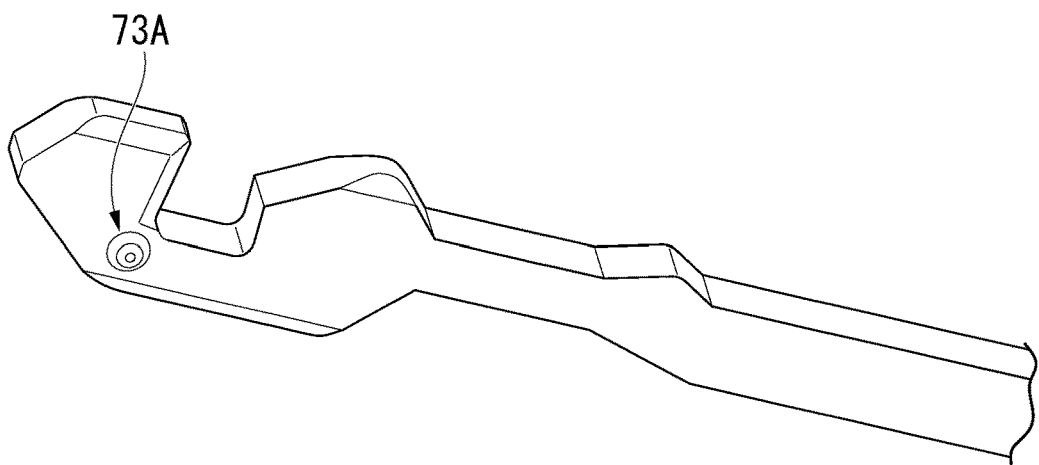
FIG. 10 is a view showing a modification example of the hook.

The aspect of the protrusion portion is not limited to the above-described configuration. The protrusion portion 73A provided in the hook according to the modification example as shown in FIG. 10 is configured to protrude to only one side in the width direction (the thickness direction of the plate-shaped material). The protrusion portion 73A may be formed by applying an impact such as the punch or the like from the opposite side besides the above-described forging and the MIM. In the case of forming the protrusion portion 73A by the punch or the like, the opposite side of the protrusion portion 73A becomes the concave portion such that there may be a case in which the thickness T2 of the protrusion portion 73A is not larger than the distance between the first arm and the second arm; however, the same effect can be achieved once the protrusion portion 73A protrudes enough on the surface at one side.

Figure 11:
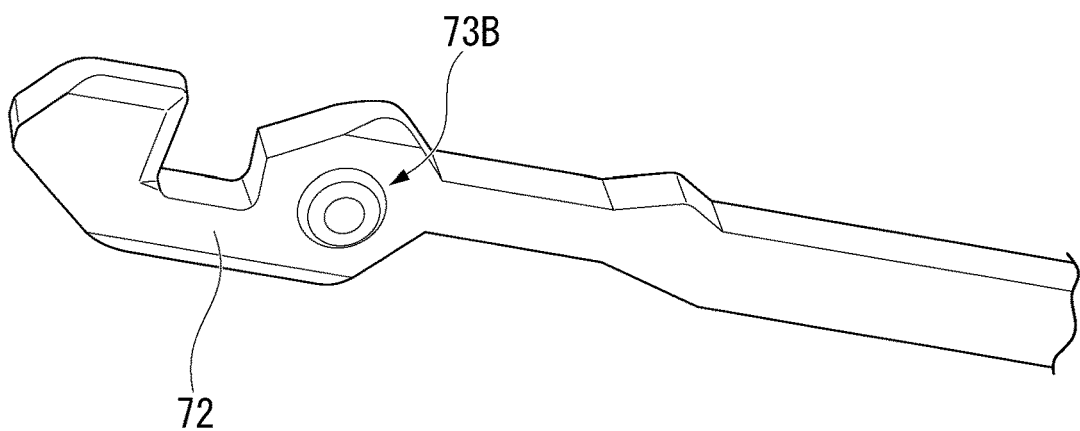
FIG. 11 is a view showing a modification example of the hook.

The position for disposing the protrusion portion may be changed. The protrusion portion 73B disposed in the hook according to the modification example as shown in FIG. 11 is positioned at the proximal side of the support portion 72.

Even in such a configuration, it is possible to prevent the whole hook from entering the space between the first arm and the second arm.

The power transmission member according to the present disclosure is not limited to the above-described wire. For example, in a case in which the present disclosure is applied to the treatment device used with the laparoscope, the power transmission member may be a rigid rod.

In the endoscopic treatment device according to the present disclosure, the structure of the engaging portion and the engaged portion may be reversed. For example, the hook may be disposed at the proximal end portion of the arm portion, and the structure in a U-shape or a loop shape that is engageable with the hook may be disposed at the distal end portion of the operation wire.

Figure 13:
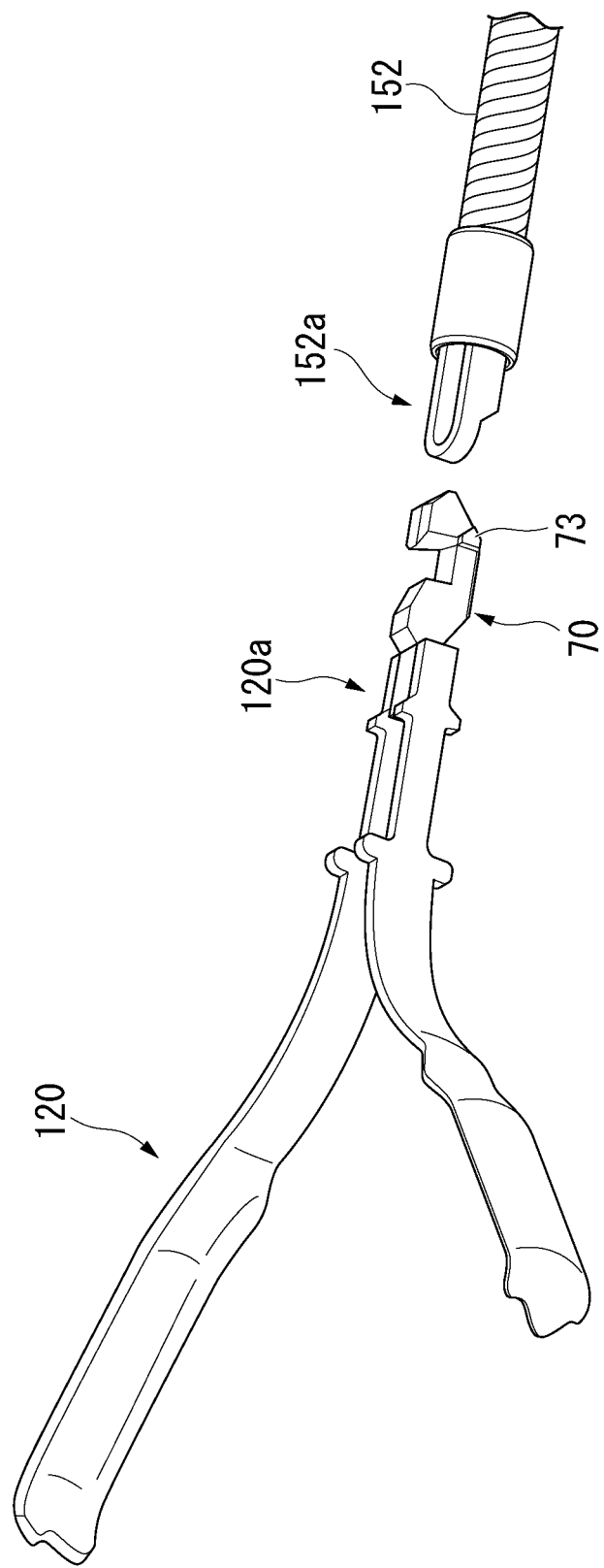
FIG. 13 is a view showing an engagement portion of the hook and the arm portion in a modification example.

The modification example of the arm portion and the operation wire in which the structure of the engaging portion and the engaged portion is reversed is shown in FIG. 13. As shown in FIG. 13, the hook 70 having the protrusion portion 73 is disposed in the proximal end portion 120a of the arm portion 120, and the hook 70 is engaged with the U-shaped engaged portion 152a disposed at the distal end of the operation wire 152. The same effect with the above-described embodiment may be achieved by such a configuration.

In the endoscopic treatment device according to the present disclosure, the structure configured to attach a new clip unit to perform the indwell procedures again after indwelling the clip unit may be applied. In this case, the configuration in which the hook is elastically deformed to release the connection with the arm portion, or as described above, the configuration in which the structure of the engaging portion and the engaged portion is reversed is preferable. The structure as shown in FIG. 13 is suitable for the case of adopting the structure in which the hook is plastic deformed to release the connection while it is possible to reload a new clip unit.

Figure 12:
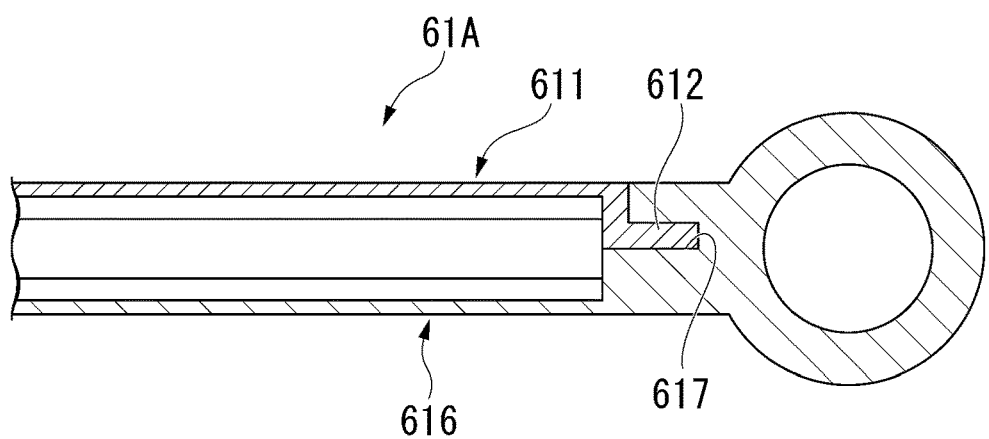
FIG. 12 is a view showing a modification example of an operation portion main body.

In the endoscopic treatment device according to the present disclosure, when the connection of the applicator and the clip unit is released, the large force is applied to the main body 61 of the operation portion 60. For example, the main body 61 may be formed by integrating two members by snap-fitting or the like, wherein the two members have a shape obtained by dividing a cylinder made of resin or the like into half. At this time, similar to the main body 61A according to the modification example as shown in FIG. 12, the protrusion 612 is provided in the first half-divided member 611, and once the first half-divided member 611 and the second half-divided member 616 are integrated in the state in which the protrusion 612 enters the concave portion 617 provided in the second half-divided member 616, it is possible to prevent the first half-divided member 611 and the second half-divided member 616 from being unintentionally separated from each other when the large force is applied to the main body.

Figure 14:
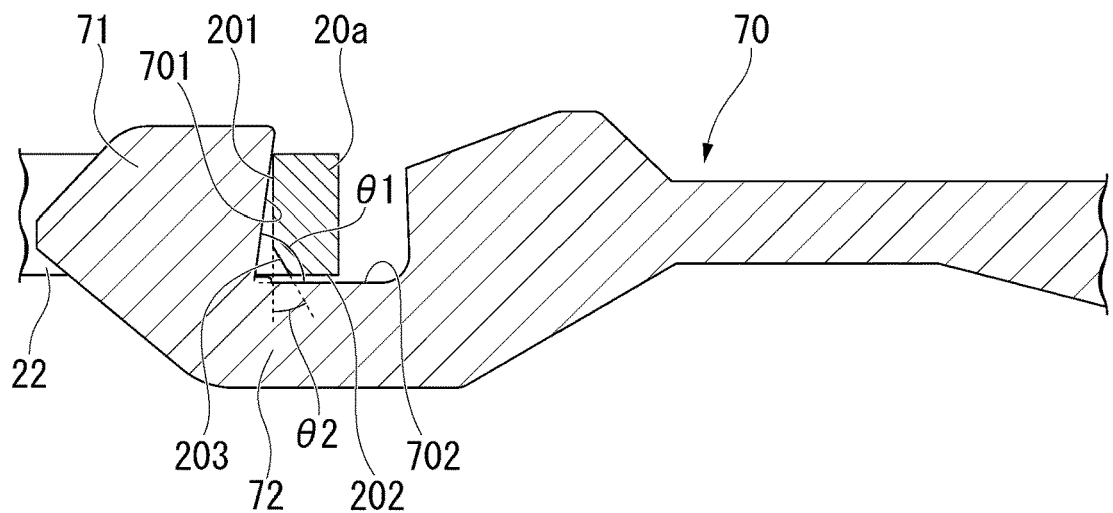
FIG. 14 is an enlarged view showing an engagement portion of the hook and the arm portion in a modification example.

FIG. 14 is an enlarged view showing the proximal end portion 20a and the hook 70. The hook 70 includes a first hook surface 701 facing the longitudinal direction of the hook 70 (the longitudinal direction of the clip unit 10) and a second hook surface 702 facing a direction intersecting with the longitudinal direction. More specifically, the hook portion 71 includes the first hook surface 701, and the support portion 72 includes the second hook surface 702. The angle θ1 formed by the first hook surface 701 and the second hook surface 702 is an acute angle. The proximal end portion 20a includes a first proximal-end-portion surface 201 being opposite to the first hook surface 701 and a second proximal-end-portion surface 202 being opposite to the second hook surface 702. An inclined surface 203 is formed between the first proximal-end-portion surface 201 and the second proximal-end-portion surface 202. It is preferable that the angle θ2 formed by the first proximal-end-portion surface 201 and the inclined surface 203 is equal to or more than 10 degrees and equal to or less than 20 degrees.

When the user retracts the slider 62, the distal end of the hook 70 is deformed due to the traction force. For example, the hook portion 71 is deformed such that the proximal surface 71a and the support portion 72 enter a state to be approximately parallel to each other, or the support portion 72 is deformed such that the hook portion 71 rotates around the support portion 72 as the rotation center. Here, if the hook portion 71 or the support portion 72 is not smoothly deformed when the user retracts the slider 62, it is possible that the hook will be broken due to the traction force. In the present modification example, accompanying with the deformation of the hook portion 71 and the support portion 72, the first hook surface 701 comes into contact with the inclined surface 203 such that it is easy for the hook 70 to slide on the proximal end portion 20a. Accordingly, when the user retracts the slider 62, it is possible for the hook portion 71 and the support portion 72 to be smoothly deformed so as to release the engagement between the hook 70 and the proximal end portion 20a without the hook 70 being broken.

Figure 15:
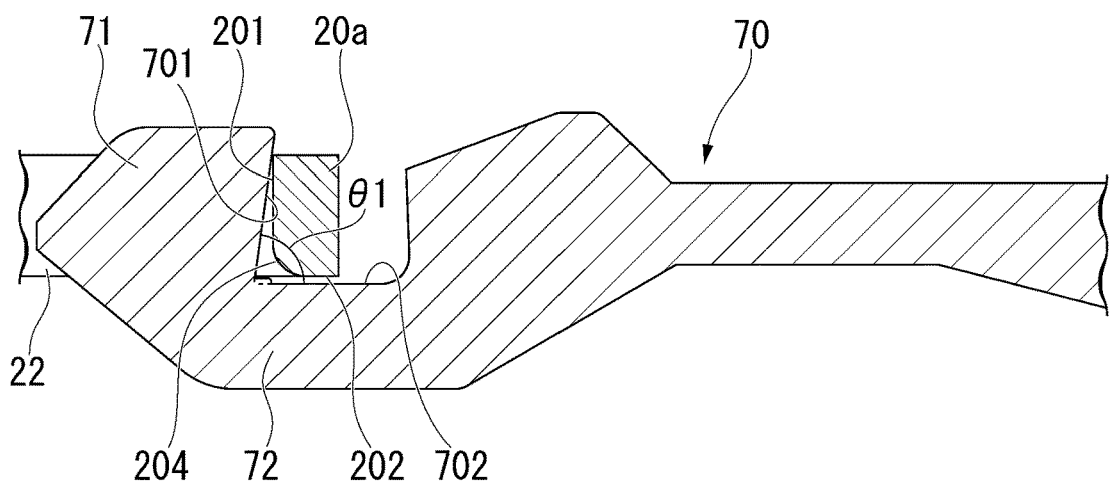
FIG. 15 is an enlarged view showing an engagement portion of the hook and the arm portion in another modification example.

As shown in FIG. 15, a curved surface 204 may be provided between the first proximal-end-portion surface 201 and the second proximal-end-portion surface 202 instead of the inclined surface 203.

Figure 16:
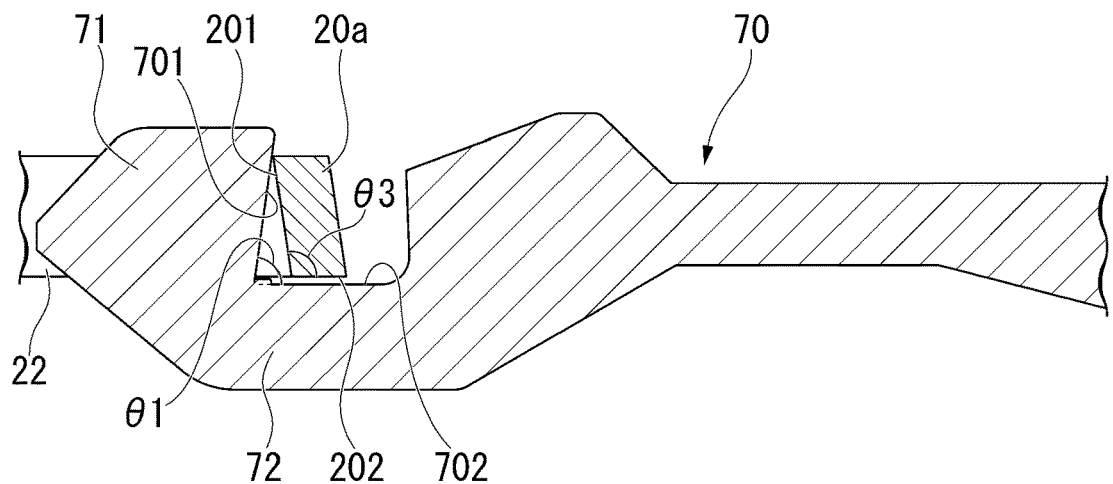
FIG. 16 is an enlarged view showing an engagement portion of the hook and the arm portion in a further modification example.

Also, as shown in FIG. 16, the angle θ3 formed between the first proximal-end-portion surface 201 and the second proximal-end-portion surface 202 may be an obtuse angle without providing the inclined surface 203 therebetween.

Although each preferred embodiment of the present invention has been described above together with each embodiment, the present invention is not limited to this embodiment and each embodiment. Configurations can be added, omitted, replaced, and other modifications without departing from the spirit of the present invention.

Further, the present invention is not limited by the above description and is limited only by the appended claims.

What is claimed is:

1. A treatment device, comprising:
   a clip including a first arm, a second arm and an engaged portion;
   an applicator including an engaging portion configured to be connected with the engaged portion;
   a hook provided in the engaging portion, disposed between the first arm and the second arm in an open-close direction of the clip, and being engageable with the engaged portion;
   a support portion provided in the engaging portion; and
   a protrusion portion provided in the engaging portion and disposed between the hook and the support portion,
   wherein:
   when at least one of the hook and the support portion is plastically or elastically deformed, the engaging portion is configured to separate from the engaged portion, and
   a width of the protrusion is larger than a width of the hook and a width of the support portion in the open-close direction.

2. The treatment device according to claim 1,
   wherein the protrusion portion is configured to restrict the support portion from approaching the engaged portion.

3. The treatment device according to claim 1,
wherein the applicator includes a wire,
when a force is applied from the wire in a state in which the engaging portion and the engaged portion are engaged with each other, at least one of the hook and the support portion is deformed so as to release the engagement between the engaging portion and the engaged portion.

4. The treatment device according to claim 1, the support portion is disposed at the same position as the engaged portion or further towards a distal end in a longitudinal direction.

5. The treatment device according to claim 1, the support portion is positioned at a location overlapping with the engaged portion in a direction intersecting a longitudinal direction and the open-close direction.

6. The treatment device according to claim 1, the support portion has a surface facing the engaged portion in a direction intersecting a longitudinal direction.

7. The treatment device according to claim 1, the engaging portion has a main body located on a proximal end relative to the support portion,
wherein the main body faces the hook in a longitudinal direction.

8. The treatment device according to claim 1, when the engaging portion moves to a proximal end in a longitudinal direction, at least one of the hook and the support portion is plastically deformed.

9. The treatment device according to claim 1, the protrusion is positioned at an intersection of a proximal portion of the hook and a distal portion of the support portion and the hook and the support portion have a same width in the open-close direction.

10. The treatment device according to claim 1,
wherein the hook includes a first hook surface facing a longitudinal direction of the clip,
the support portion includes a second hook surface facing a direction intersecting with the longitudinal direction, and
an angle formed between the first hook surface and the second hook surface is an acute angle.

11. The treatment device according to claim 10,
wherein the engaged portion includes:
a first proximal-end-portion surface being opposite to the first hook surface;
a second proximal-end-portion surface being opposite to the second hook surface; and
an inclined surface formed between the first proximal-end-portion surface and the second proximal-end-portion surface.

12. The treatment device according to claim 10,
wherein the engaged portion includes:
a first proximal-end-portion surface being opposite to the first hook surface;
a second proximal-end-portion surface being opposite to the second hook surface; and
a curved surface formed between the first proximal-end-portion surface and the second proximal-end-portion surface.

13. The treatment device according to claim 10,
wherein the engaged portion includes:
a first proximal-end-portion surface being opposite to the first hook surface;
a second proximal-end-portion surface being opposite to the second hook surface; and
an angle formed between the first proximal-end-portion surface and the second proximal-end-portion surface is an obtuse angle.

14. An endoscopic treatment device, comprising:
a clip unit including an arm portion having a first arm and a second arm, the first arm and the second arm being connected with each other at a proximal end portion of the arm portion;
a power transmission member;
an applicator connected with the clip unit;
an engaging portion provided in one of the proximal end portion or the power transmission member; and
an engaged portion provided in the other of the proximal end portion or the power transmission member without the engaging portion,
wherein the engaging portion includes:
a hook portion entering the engaged portion so as to be engageable with the engaged portion;
a support portion continuing with the hook portion; and
a protrusion portion having a dimension so as to be impossible to enter the engaged portion, wherein:
when a force is applied to the power transmission member in a state in which the engaging portion and the engaged portion are engaged with each other, at least one of the hook portion and the support portion is plastically or elastically deformed so as to release an engagement between the engaging portion and the engaged portion; and
the protrusion portion is positioned at an intersection of a proximal portion of the hook portion and a distal portion of the support portion and the protrusion portion has a greater thickness than the thickness of the hook portion and the support portion.

15. The endoscopic treatment device according to claim 14, the support portion is positioned at a location overlapping with the engaged portion in a direction intersecting a longitudinal direction and an open-close direction.

16. The treatment device according to claim 14, the engaging portion has a main body located on the proximal end relative to the support portion, wherein the main body faces the hook portion in a longitudinal direction.

17. The treatment device according to claim 14, the protrusion portion is positioned at an intersection of a proximal portion of the hook portion and the hook portion and the support portion have a same thickness.

18. The endoscopic treatment device according to claim 14, the support portion is positioned at a location overlapping with the engaged portion in a direction intersecting a longitudinal direction and an open-close direction.

19. The treatment device according to claim 14, the protrusion portion is positioned at an intersection of a proximal portion of the hook portion and the hook portion and the support portion have a same thickness.

20. A clip unit configured to be connectable with an applicator having an engaging portion, comprising:
an arm portion including a first arm and a second arm, and an engaging portion being engageable with the engaged portion at a proximal end portion of the arm portion; and
a tubular member having a distal end opening and a proximal end opening, a proximal end side of the arm portion being able to be accommodated in the tubular member from the distal end opening, wherein:
the engaging portion including:
a hook portion entering the engaged portion so as to be engageable with the engaged portion;

a support portion continuing with the hook portion; and a protrusion portion having a dimension so as to be impossible to enter the engaged portion, at least one of the hook portion and the support portion is plastically or elastically deformed so as to release an engagement between the engaging portion and the engaged portion, and the protrusion portion is positioned at an intersection of a proximal portion of the hook portion and a distal portion of the support portion and the protrusion portion has a greater thickness than the thickness of the hook portion and the support portion.

* * * * *